Patented June 2, 1936

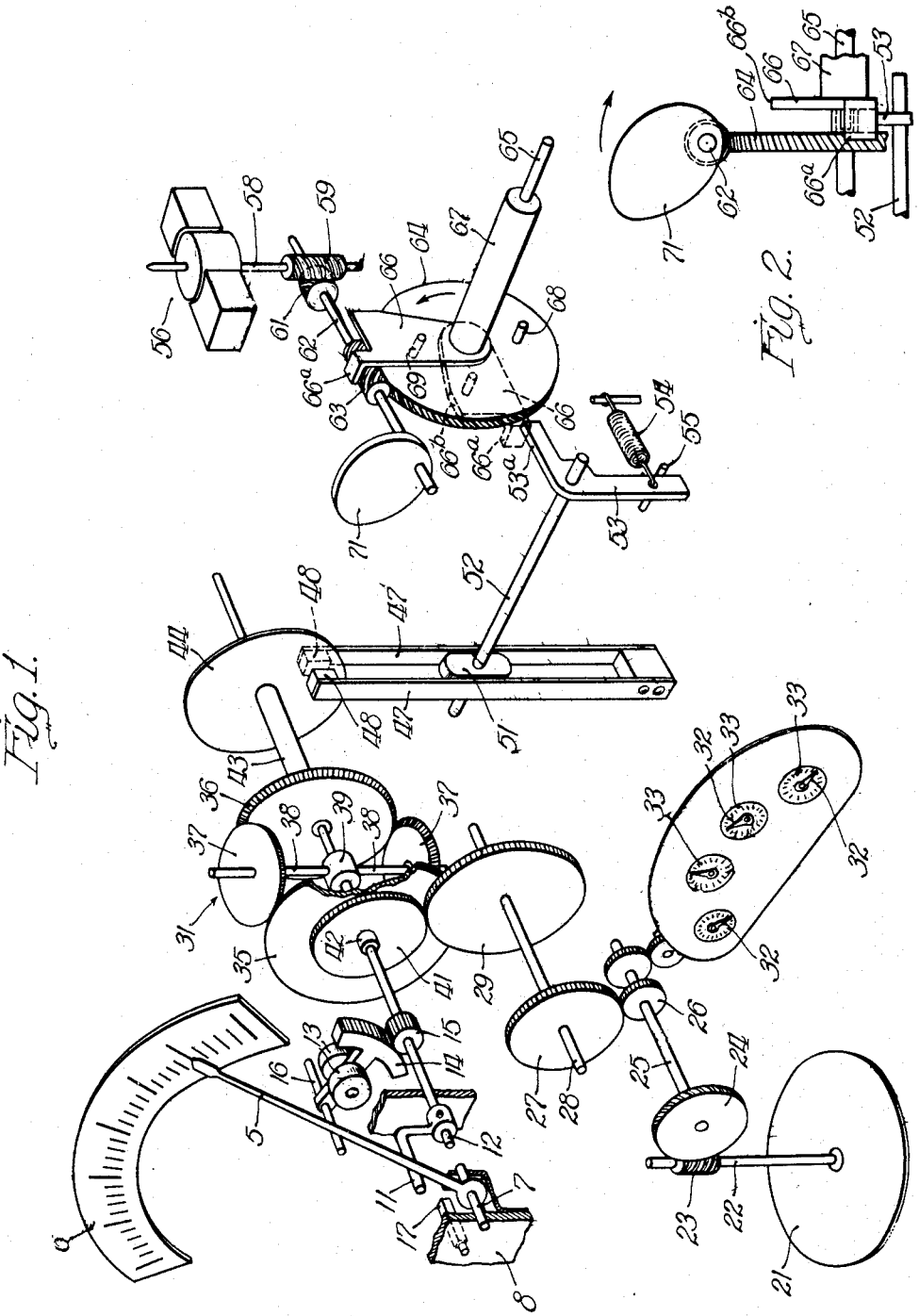

2,042,601

UNITED STATES PATENT OFFICE

2,042,601

MAXIMUM DEMAND METER

Frederick C. Holtz, Springfield, Ill., assignor to Sangamo Electric Company, Springfield, Ill., a corporation of Illinois Application July 3, 1935, Serial No. 29,603

19 Claims. (Cl. 171—34)

The present invention relates to maximum demand meters, particularly of the integrating or watthour type.

The maximum demand mechanism of these meters generally comprises a pointer which is advanced, or moved positively to successive positions over an arcuate scale, being frictionally retained in its most advanced position, and being adapted to be restored or reset to zero position by the meter inspector at the end of the month. At this time the meter inspector notes the position to which the pointer has been advanced as the maximum demand for that month. The pointer is adapted to be pushed ahead to different positions by an advancing member which is actuated in a forward or positive direction by the watthour motor element at a rate proportional to the wattage consumed. Periodically, at the end of a predetermined time interval, for example every twenty minutes or every thirty minutes, the advancing member is automatically reset to its initial position; the pointer, however, remaining in the farthest position to which it has been advanced in that time interval or in any other preceding time interval, and being only reset by the meter inspector at the time of reading the meter. The periodic, automatic resetting of the advancing member is usually performed by energy stored in a weight or a spring. The measurement of the fixed time intervals, at the end of which the advancing member is automatically reset, is usually performed by a suitable clock movement, or by a synchronous motor running at constant speed. It is desirable that the automatic resetting of the advancing member be performed rather quickly, so as to avoid error in the maximum demand indications.

The majority of maximum demand devices with which I am familiar have been objectionable from the standpoint of complexity and unreliability, particularly in that part of the apparatus having to do with the transmission of motion from the watthour motor to the advancing member, and having to do with the periodic resetting of the advancing member to its initial position. These devices have necessitated relatively complicated arrangements of disengaging gears, clutches, cams and the like for interrupting the driving relation between the watthour motor and the advancing member, and for resetting the advancing member to its initial position.

One of the objects of the present invention is to avoid the objections to these prior constructions by driving and advancing member from the watthour motor through an improved driving mechanism having a differential gear action. This differential gear mechanism may be considered as comprising three gears, to-wit, a driving gear connected with the watthour motor, a driven gear connected with the advancing member, and a reaction gear which controls the motion transmitting relation between the driving and driven gears. A control exercised over the reaction gear results in (1) a normal driving relation during the twenty minute or thirty minute interval while the watthour motor is driving the advancing member; (2) a substantially instantaneous cessation of this driving relation at the moment of resetting the advancing member; (3) freedom of the driven gear to rotate in a reverse direction during the resetting of the advancing member; and (4) a substantially instantaneous restarting of the driving relation between the driving and driven gears at the end of the resetting operation. This is all accomplished in the differential gear mechanism without disengaging any of the gears, and without necessitating any clutches in the driving train requiring to be engaged and disengaged.

Another object of the invention is to provide improved time responsive mechanism which governs the time interval at the end of which the advancing member is reset. More specifically, in the present embodiment this time responsive mechanism controls the motion of the reaction gear.

Other objects and advantages of the invention will appear from the following detail description of one preferred embodiment thereof. In the accompanying drawing illustrating this embodiment:—

Figure 1 is a perspective or schematic view of the main parts of the mechanism; and Figure 2 is a fragmentary front elevational view showing certain parts of the time responsive mechanism.

The indicating element of the maximum demand apparatus is shown in the form of a pointer 5 adapted to be advanced to different positions over an arcuate scale 6, although it will be understood that the indicating element or device may be of other forms, if desired. The pointer is mounted on a short pivot shaft 7 which is rotatably mounted in any suitable part of the frame structure 8 of the meter. Appropriate frictional means is usually associated with the pointer 5 for holding the latter in any position to which it may have been pushed by the advancing member. Any well known mechanism, arranged for operation by an authorized meter inspector, may be provided for restoring the pointer 5 to its zero position at the end of the month or other predetermined accounting period.

The advancing or actuating member preferably consists of a crank 11 fixedly mounted on a rotatable shaft 12 and arranged to engage the back side of the pointer 5 for advancing the pointer to successive positions over the scale. For restoring the advancing member 11 to its initial position at the end of each maximum demand interval, there is preferably provided a weight 13 mounted on a gear sector 14 which meshes with a pinion 15 on the shaft 12. The sector 14 is pivoted upon any stationarily mounted shaft 16 carried by the frame of the meter. As the shaft 12 revolves in a clockwise direction for causing the advancing member 11 to move in an advancing direction, it also causes the sector 14 to swing up to a higher position, thereby storing energy in the weight 13. When the shaft 12 is released at the end of the predetermined maximum demand interval, the energy stored in the weight 13 revolves the shaft in the opposite direction for swinging the advancing member 11 back to its initial or starting position. This initial or starting position is determined by the engagement of the advancing member 11 against any suitable stop 17. The return of the advancing member 11 to its initial position does not, of course, return the pointer 5 to its initial position, because the connection between the two is merely a one-way or pushing connection. Spring mechanism may be substituted for the weight 13 for returning the advancing member to initial position, if desired.

The watthour motor is diagrammatically represented by the disc 21, it being understood that this disc rotates at a rate proportional to wattage consumption, as is well understood in these meters. Any conventional speed reducing gear train is diagrammatically represented by the spindle 22 extending from the disc 21, the worm 23 on this spindle, the worm wheel 24 driven by and mounted on the countershaft 25, the pinion 26 on said countershaft meshing with the large gear 27 on a second countershaft 28, and the gear 29 on said latter countershaft arranged to transmit motion through the differential gear mechanism, indicated in its entirety at 31. The worm 23 and worm wheel 24 preferably establish an irreversible driving connection which prevents reverse rotation being transmitted back to the watthour motor 21 when no current is being consumed. The pointers 32 of the conventional watthour dials 33 are arranged to be driven through suitable geared connection with any desired point of the speed reducing gear train.

For simplicity of illustration, I have shown the differential gear mechanism as being of the bevel gear type, although in practice I preferably employ a spur gear differential, the principle being the same in both cases. The illustrated construction comprises two main bevel gears 35 and 36 mounted on a common axis and capable of independent rotation. Mounted between and meshing with both main bevel gears are the small secondary gears 37, frequently called compensating gears. Any desired number of these secondary gears 37 may be arranged for meshing with the main gears 35 and 36. The secondary gears are rotatably mounted on spindles 38 which have their inner ends fixedly secured in a hub 39. This hub 39 is fixedly secured on the rotatable shaft 12 which drives the advancing member 11. Thus, the secondary gears 37, 37 are rotatable about the axes of the spindles 38, and are also rotatable about the common axis of the large bevel gears 35 and 36. The main bevel gear 35 has fixedly secured thereto a spur gear 41, which meshes with the spur gear 29, whereby the main bevel gear 35 is driven at a rate proportional to the rate of rotation of the watthour motor 21. The two connected gears 35 and 41 are mounted on a sleeve 42 which is rotatable freely on the shaft 12. The other bevel gear 36 is secured to a sleeve 43 which is also rotatable freely on the shaft 12. The opposite end of the sleeve 43 has a brake disc 44 secured thereto, whereby the ability of the main bevel gear 36 to rotate is dependent upon the ability of the brake disc 44 to rotate. It will be noted that in this particular embodiment of differential gear mechanism the large bevel gear 35 constitutes the driving gear, either of the small bevel gears 37 constitutes a driven gear, and the other large bevel gear 36 constitutes a reaction gear which controls the motion transmitting relation between the driving and driven gears.

Referring now to the time responsive mechanism which controls the brake disc 44, it will be seen that two leaf springs 47 carrying friction pads 48 at their free ends are operable to bear against opposite sides of the disc 44. The amount of energy transmitted to the brake disc is relatively small and the stopping of said disc by friction is entirely adequate for effective operation, although it will be understood that positive braking may be provided for if desired, as by arranging cooperating projections on the disc 44 and on the leaf springs 47. Normally, the leaf springs press their pads 48 against the disc 44 for holding the latter against rotation. For freeing the disc to permit rotation thereof, the leaf springs are spread apart by the action of a cam 51 which is disposed between the two springs and is mounted on a shaft 52. The shaft is actuated through the oscillation of a bell crank lever 53 mounted thereon. A spring 54 connected with said lever normally holds one arm of said lever against a stop pin 55, in which position the cam 51 is non-operative and the leaf springs 47 hold the brake disc 44 against rotation. At fixed intervals, a downward force is applied to the other arm 53a of the bell crank lever for oscillating the latter and the cam 51 into a position which frees the disc 44.

The mechanism for causing this periodic actuation of the bell crank lever comprises time responsive driving means, preferably in the form of a small constantly operating synchronous motor 56, although clock spring mechanism might be employed, if desired. The shaft 58 of this motor drives a worm 59 which meshes with a worm wheel 61 secured to another shaft 62. Mounted on the latter shaft is a worm 63 meshing with a relatively large worm wheel 64, which is arranged to rotate in a counterclockwise direction on the shaft 65. It is desirable that the worm wheel 64 rotate at a speed considerably slower than the shaft 62, and one or more additional sets of worm gearing are preferably interposed between said shaft 62 and wheel 64, this additional worm gearing not being shown in the simplified illustration since its relation is obvious. Cooperating with the large worm wheel 64 is a crank or lever 66 secured to a sleeve 67 which is freely rotatable on the shaft 65. The worm wheel 64 is arranged to drive said crank or lever 66 through the instrumentality of a driving pin 68 projecting laterally from the face of the worm wheel and adapted to engage a cooperating pin 69 projecting inwardly from the side of the crank or lever. The engagement of the pin 68 against the back side of the pin 69 transmits a one-way or pushing drive to the member 66, which allows said member to swing downwardly and run ahead of the worm wheel once each revolution. The outer end of said member 66 has a laterally bent projection 66a which is adapted to drop down upon the projecting end 53a of the bell crank lever 53. Rotating with the shaft 62 is a cam 71 which is adapted to engage the back edge 66b of the arm 66 and to exert downward pressure thereon when the lug projection 66a of the latter is resting on the bell crank arm 53a. The action of this mechanism is to effect a release of the brake disc 44 at the end of each predetermined time interval, but to have this release effective only for a comparative short interval of time. For example, in one preferred construction of my invention, the release of the brake disc occurs every thirty minutes, but the disc is only released for an interval of one or two seconds. In such a timed relation, the gear ratios are so proportioned that the cam 71 makes one revolution approximately every two seconds while the worm wheel 64 only makes one revolution every thirty minutes. The path of the cam 71 is such that the cam is ineffective to engage the bell crank arm 53a directly, and it is only when the arm 66 is interposed between the cam and the bell crank lever, in the relation of a filler member, that the cam is effective to transmit motion to the bell crank lever. The filler arm 66 is free to swing under the force of gravity, and at the end of a releasing operation after the filler arm has been forced past the end of the bell crank arm 53a the filler arm drops straight down to a position below the sleeve 67. It remains in this position until the pin 68 on the worm wheel 64 comes up against the back side of the pin 69 on the filler arm, whereupon the arm is caused to be carried upwardly in the counterclockwise direction indicated, during the slow rotation of the worm wheel 64. Arriving in a position extending substantially straight upwardly above the sleeve 67, the filler arm then passes beyond the balancing point and thereupon drops quickly down into engagement with the arm 53a of the bell crank lever 53. The parts are preferably so proportioned and related that this dropping of the filler arm down against the bell crank lever occurs while the cam 71 is in that portion of its rotative movement where it will not interfere with the complete movement of the filler arm down into engagement with the bell crank lever. This timed relation between the angular position of the cam and the falling of the filler member need not be of critical concern, however, because the falling motion of the filler member is so much faster than the rotary motion of the cam that no harmful interference can arise between the two. With the arm 66 now interposed in the position of a filler or motion transmitting member, the cam 71 is effective as a power device to transmit tripping actuation to the bell crank lever through the engagement of the cam with the surface 66b of the filler arm. The cam thus forces the filler member and bell crank arm 53a downwardly, thereby causing the bell crank lever to rock through the required movement for effecting complete release of the friction pads 48 from the brake disc 44. This downward movement imparted by the cam also forces the filler member 66 down off the depressed end of the bell crank arm 53a, whereupon said filler member drops down to its lower position, to be again carried upwardly by the worm wheel 64 in a repetition of the cycle above described. As soon as the filler member is forced past the end of the bell crank arm 53a, this bell crank is immediately restored to its original position by the spring 54, and the brake disc 44 is thereupon engaged by the brake pads 48 for stopping the disc.

It will be evident that when the brake disc is held against rotation the large bevel gear 36 functions as a reaction member, against which the small gears 37 react in the transmission of motion to the advancing member 11. When the brake disc is released the large gear 36 is free to rotate, and the small gears no longer have a point of reaction. Hence, the resetting force exerted by the resetting means 13—15 causes the small gears 37 and their spindles 38 to rotate as a unit in a counterclockwise direction, and the reaction gear 36 is carried along in this motion, the reaction gear rotating at a higher speed than the spindles 38 by reason of the fact that the other large gear 35 is not rotating in this direction. Thus, the advancing member 11 can be quickly reset from any advanced position to its initial position without disturbing the motion of the large gear 35, which can continue to be driven from the motor device 21 during the resetting operation. Also, this resetting operation does not necessitate disconnecting the driving train at any point between the motor device and the advancing member, the gears 35, 36 and 37 remaining permanently meshed together at all times.

While I have illustrated and described what I regard to be a preferred embodiment of my invention, nevertheless I wish it to be understood that my invention is not limited thereto but that numerous modifications and rearrangements may be made without departing from the essence of the invention. For example, within my broad disclosure of differential gear mechanism functioning in the combination above described are embraced other arrangements of differential gear apparatus, represented typically by what is frequently termed "planetary" gear mechanism, having similar differential characteristics. As illustrative of one arrangement of the latter gear mechanism, the central or "sun" gear could be the driving gear actuated by the motor element 21; the "planetary" gears revolving around this sun gear could be the reaction gears connected to the brake disc 44; and the outer or surrounding ring gear could be the driven gear connected with the advancing member 11. In this relation the brake disc 44 would control the motion of the axes on which the planetary gears are mounted, but the planetary gears themselves would be free to rotate on these axes at all times. Other modified arrangements of planetary gearing could also be employed wherein the brake disc would control the rotation of the sun gear, or would control the rotation of the outer ring gear.

I claim:—

1. A maximum demand meter comprising an indicating member, an advancing member operable to advance said indicating member, a meter motor for imparting positive motion to said advancing member, motion transmitting mechanism comprising three cooperating gears, one of said gears being connected with said advancing member, another of said gears being connected with said motor, and time controlled friction brake mechanism governing the motion of the third gear.

2. In combination, an indicating member, an advancing member operable to advance said indicating member, an actuating member for imparting positive motion to said advancing member, differential gear motion transmitting mechanism comprising three cooperating gears, one of said gears being connected with said advancing member, another of said gears being connected with said actuating member, and time controlled friction brake mechanism governing the motion of the third gear.

3. A maximum demand meter comprising an indicating member, an advancing member operable to advance said indicating member, an electric meter motor for driving said advancing member, differential gear mechanism comprising three constantly meshing gear elements, one of said gear elements being connected with said advancing member, another of said gear elements being connected with said electric motor, a friction brake for controlling the motion of the third gear element, time responsive means governing the operation of said brake, and means operating to reset said advancing member upon the release of said brake.

4. A maximum demand meter comprising a maximum demand indicator, an advancing member therefor adapted to be reset independently thereof, a meter motor for driving said advancing member, motion transmitting mechanism comprising a gear connected with said advancing member, a gear connected with said motor and remaining in constant mesh with said first mentioned gear, and a reaction gear in constant mesh with said first mentioned gear, friction brake mechanism for normally holding said reaction gear against motion, time responsive means operating to release said brake mechanism at regular time intervals, and means operating to reset said advancing member upon the release of said brake mechanism.

5. A maximum demand meter comprising a maximum demand indicator, an advancing member, including a drive shaft therefor, adapted to be reset independently of said indicator, a meter motor for driving said shaft in a positive direction, differential gear motion transmitting mechanism comprising three gears in permanently meshed relation, one of said gears being mounted to rotate with said shaft, another of said gears being loosely mounted coaxially with said shaft and connected with said motor, the third gear being also loosely mounted coaxially with said shaft, friction brake mechanism for normally holding the third gear against rotation, time responsive means for periodically releasing said brake mechanism for short intervals of time, and means operative to reset said advancing member upon the release of said brake mechanism.

6. A maximum demand meter comprising an indicator, an advancing member operable to advance said indicator, an electric meter motor, driving means connecting said motor with said advancing member for actuating the same to advance the indicator, a resetting device for resetting said advancing member independently of said indicator, a connection between said driving means and said resetting device operating to store energy in said resetting device upon the positive actuation of said driving means and to cause reverse movement of said advancing member upon the release of such stored energy, and time responsive means for periodically releasing such stored energy, to reset said advancing member.

7. A maximum demand meter comprising an indicator, an advancing member operable to advance said indicator, an electric meter motor, driving means connecting said motor with said advancing member for actuating the same to advance the indicator, a resetting device for resetting said advancing member independently of said indicator, a connection between said driving means and said resetting device operating to store energy in said resetting device upon the positive actuation of said driving means and to cause reverse movement of said advancing member upon the release of such stored energy, and time controlled brake mechanism for periodically releasing such stored energy, to reset said advancing member.

8. A maximum demand meter comprising a maximum demand indicator, an advancing member for advancing said indicator, resetting means for resetting said advancing member independently of said indicator, a meter motor, driving means including differential gear mechanism for positively actuating said advancing member by said motor, a connection between said driving means and said resetting means, operating to store energy in said resetting means upon the positive actuation of said driving means, and to cause reverse movement of said advancing member upon the release of such stored energy, and means coacting with said differential gear mechanism enabling said resetting means to reset said advancing member at regular time intervals.

9. A maximum demand meter comprising a maximum demand indicator, an advancing member for advancing said indicator, resetting means for resetting said advancing member independently of said indicator, a meter motor, driving means including differential gear mechanism for positively actuating said advancing member by said motor, a connection between said driving means and said resetting means, operating to store energy in said resetting means upon the positive actuation of said driving means, and to cause reverse movement of said advancing member upon the release of such stored energy, and time controlled brake mechanism coacting with said differential gear mechanism for periodically releasing such stored energy, to reset said advancing member.

10. A maximum demand meter comprising a maximum demand indicator, an advancing member therefor adapted to be reset independently thereof, an electric motor, motion transmitting mechanism comprising three cooperating gears, one of said gears being connected with said advancing member, another of said gears being connected with said electric motor, a brake for controlling the motion of the third gear, a brake releasing device, means for actuating said brake releasing device, comprising a time responsive device, and members rotated at different rates of speed by said time responsive device to make temporary contact with each other at predetermined time intervals and thereupon cooperate to actuate said brake releasing device, and means for resetting said advancing member upon the release of said brake.

11. A maximum demand meter comprising a maximum demand indicator, an advancing member therefor adapted to be reset independently thereof, a load responsive motor in said meter, motion transmitting mechanism connecting said motor with said advancing member, a brake, resetting means for resetting said advancing member when said brake is released, a brake releasing device, and means for actuating said brake releasing device, comprising a time responsive device, a power member rotated by said time responsive device through a path spaced from said brake releasing device, and a filler member rotated by said time responsive device through a path that intersects the path of said power member, whereby said filler member is temporarily interposed between said power member and said brake releasing device at predetermined time intervals, to enable said power member to actuate said brake releasing device.

12. The combination with a brake and a brake releasing device, of means for actuating said brake releasing device comprising a time responsive device and members rotated at different rates of speed by said time responsive device to make temporary contact with each other at predetermined time intervals and thereupon cooperate to actuate said brake releasing device.

13. A maximum demand meter comprising a maximum demand indicator, an advancing member therefor adapted to be reset independently thereof, and means for periodically resetting said advancing member comprising an operating device adapted to have a timed operation, a constant speed driving device, a first member driven by said driving device at one speed, a second member driven by said driving device at a different speed, said two members having coacting contact at predetermined time intervals, and means mechanically responsive to said coacting contact for actuating said operating device.

14. In combination, an operating device adapted to have timed operation, a constant speed driving device, a power member driven by said driving device with a constant motion at one speed, said power member having cyclic motion in a path spaced from said operating device, and a filler member driven by said driving device with an intermittent motion at a different speed, said filler member being automatically interposed between said power member and said operating device at predetermined time intervals whereby said power member is enabled to transmit motion to said operating device.

15. A maximum demand meter comprising a maximum demand indicator, an advancing member therefor adapted to be reset independently thereof, an electric motor, motion transmitting mechanism comprising three cooperating differential gears, one of said gears being connected with said advancing member, another of said gears being connected with said electric motor, a brake disc for controlling the motion of the third gear, a pair of spring arms adapted to press against opposite sides of said brake disc for holding the latter against motion, a cam between said spring arms operable to spread said arms to release said disc, and time controlled means for actuating said cam.

16. A maximum demand meter comprising a maximum demand indicator, an advancing member therefor adapted to be reset independently thereof, an electric motor, differential gear mechanism for transmitting motion from said electric motor to said advancing member, a brake associated with said differential gear mechanism controlling the resetting of said advancing member, a brake control device, time responsive means, a power member driven by said time responsive means with a substantially constant motion at one speed, said power member having rotary motion in a path spaced from said brake control device, and a filler member driven by said time responsive means with an intermittent motion and at a slower speed than said power member, said filler member being automatically interposed between said power member and said brake control device at predetermined time intervals whereby said power member is enabled to transmit motion to said brake control device.

17. A maximum demand meter comprising an indicating member, an advancing member therefor adapted to be reset independently thereof, an electric motor, motion transmitting mechanism for transmitting a drive from said motor to said advancing member, said motion transmitting mechanism comprising a reset control device enabling said advancing member to be reset at predetermined intervals, a time responsive device, a cam driven by said time responsive device, and a rotating power transmitter driven through part of its cycle of rotation at a relatively slow speed by said time responsive device, said power transmitter moving with a relatively quick motion through another part of its cycle of rotation into a position where it serves to transmit motion from said cam to said reset control device.

18. In combination, an operating device adapted to have timed operation, a constant speed driving device, a cam driven by said constant speed driving device, and a rotating power transmitter driven through part of its cycle of rotation at a relatively slow speed by said time responsive device, said power transmitter moving with a relatively quick motion through another part of its cycle of rotation into a position where it serves to transmit motion from said cam to said operating device.

19. A maximum demand meter comprising a maximum demand indicator, an advancing member therefor adapted to be reset independently thereof, an electric meter motor, differential gear mechanism for transmitting motion from said electric motor to said advancing member, time responsive means for placing said differential gear mechanism in condition to permit said advancing member to be reset, and resetting means comprising a pinion operatively connected with said advancing member, and a gear sector meshing with said pinion, said gear sector being mounted independently of said differential gear mechanism and being actuated by said meter motor to store up energy for resetting said advancing member.

FREDERICK C. HOLTZ.